United States Patent
Bellorado et al.

(10) Patent No.: US 10,318,414 B2
(45) Date of Patent: Jun. 11, 2019

(54) MEMORY SYSTEM AND MEMORY MANAGEMENT METHOD THEREOF

(71) Applicant: SK hynix Inc., Gyeonggi-do OT (KR)

(72) Inventors: Jason Bellorado, San Jose, CA (US); Xiangyu Tang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 14/927,135

(22) Filed: Oct. 29, 2015

(65) Prior Publication Data
US 2016/0124848 A1      May 5, 2016

Related U.S. Application Data

(60) Provisional application No. 62/072,332, filed on Oct. 29, 2014.

(51) Int. Cl.
| | |
|---|---|
| G06F 9/45 | (2006.01) |
| G06F 12/08 | (2016.01) |
| G06F 12/0808 | (2016.01) |
| G06F 12/0815 | (2016.01) |
| G06F 12/02 | (2006.01) |
| G06F 12/12 | (2016.01) |

(52) U.S. Cl.
CPC ...... *G06F 12/0253* (2013.01); *G06F 12/0246* (2013.01); *G06F 12/12* (2013.01); *G06F 2212/7205* (2013.01)

(58) Field of Classification Search
CPC .................................................. G06F 12/08
USPC ......................................................... 711/103
See application file for complete search history.

(56) References Cited

U.S. PATENT DOCUMENTS

| | | | | |
|---|---|---|---|---|
| 8,898,410 | B1* | 11/2014 | Ehrenberg | G06F 12/0246 711/162 |
| 9,141,526 | B2* | 9/2015 | Iliadis | G06F 12/0246 |
| 2008/0109590 | A1* | 5/2008 | Jung | G06F 12/0246 711/103 |
| 2010/0318719 | A1* | 12/2010 | Keays | G06F 12/0246 711/103 |
| 2011/0145473 | A1* | 6/2011 | Maheshwari | G06F 12/0866 711/103 |
| 2012/0198128 | A1* | 8/2012 | Van Aken | G06F 12/0246 711/103 |
| 2012/0221784 | A1* | 8/2012 | Ban | G06F 12/0246 711/103 |
| 2013/0024609 | A1* | 1/2013 | Gorobets | G06F 12/0246 711/103 |
| 2013/0111115 | A1* | 5/2013 | Iliadis | G06F 12/02 711/103 |
| 2013/0117501 | A1* | 5/2013 | Yun | G06F 12/0246 711/103 |
| 2013/0166822 | A1* | 6/2013 | Franceschini | G06F 3/0601 711/103 |
| 2013/0173875 | A1* | 7/2013 | Kim | G06F 12/0246 711/160 |

(Continued)

*Primary Examiner* — Mohamed M Gebril
(74) *Attorney, Agent, or Firm* — IP & T Group LLP (57) ABSTRACT

A memory system include a memory device including a plurality of blocks, each of the blocks having a plurality of pages, and a controller suitable for determining valid pages from among the plurality of pages based on data temperature, and performing a garbage collection process based on a number of valid pages and data temperature of the valid pages.

12 Claims, 8 Drawing Sheets

(56) References Cited

U.S. PATENT DOCUMENTS

| | | | |
|---|---|---|---|
| 2014/0032817 A1* | 1/2014 | Bux | G06F 12/0246 711/103 |
| 2014/0059279 A1* | 2/2014 | He | G06F 12/0246 711/103 |
| 2014/0164687 A1 | 6/2014 | Kwon et al. | |
| 2014/0173176 A1* | 6/2014 | Kang | G06F 12/0246 711/103 |
| 2014/0207997 A1* | 7/2014 | Peterson | G06F 12/0246 711/103 |
| 2015/0186072 A1* | 7/2015 | Darragh | G06F 3/0653 711/103 |

* cited by examiner

MEMORY SYSTEM AND MEMORY MANAGEMENT METHOD THEREOF

CROSS-REFERENCE TO RELATED APPLICATIONS

This application claims the benefit of U.S. Provisional Application No. 62/072,332, filed Oct. 29, 2014 the entire contents of which are incorporated herein by reference.

BACKGROUND

1. Field

Exemplary embodiments of the present disclosure relate to a memory system including a non-volatile storage medium, and more particularly, to a memory system including a memory device and a method for managing the memory device.

2. Description of the Related Art

Non-volatile storage mediums such as flash memory are increasingly gaining applications in both enterprise and consumer data storage solutions. The flash memories are resilient to shock and their input/output (I/O) performance is better than that of conventional hard disk drives. Also, in contrast to the conventional hard disk drives, the flash memories are small in size and consume little power. However, due to the limited storage space, an improvement of memory management is in need.

SUMMARY

Embodiments of the present disclosure are directed to a memory system including a memory device and a method for management of the memory device.

Aspects of the invention include a memory system. The memory system may include a memory device including a plurality of blocks, each of the blocks including a plurality of pages; and a controller suitable for determining valid pages from among the plurality of pages based on data temperature, and performing a garbage collection process based on a number of valid pages and data temperature of the valid pages.

Further aspects of the invention include a method for controlling a memory system having a memory device including a plurality of blocks, each of the blocks including a plurality of pages. The method may include determining valid pages from among the plurality of pages based on data temperature; and performing a garbage collection process based on a number of valid pages and data temperature of the valid pages.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

Figure 1:
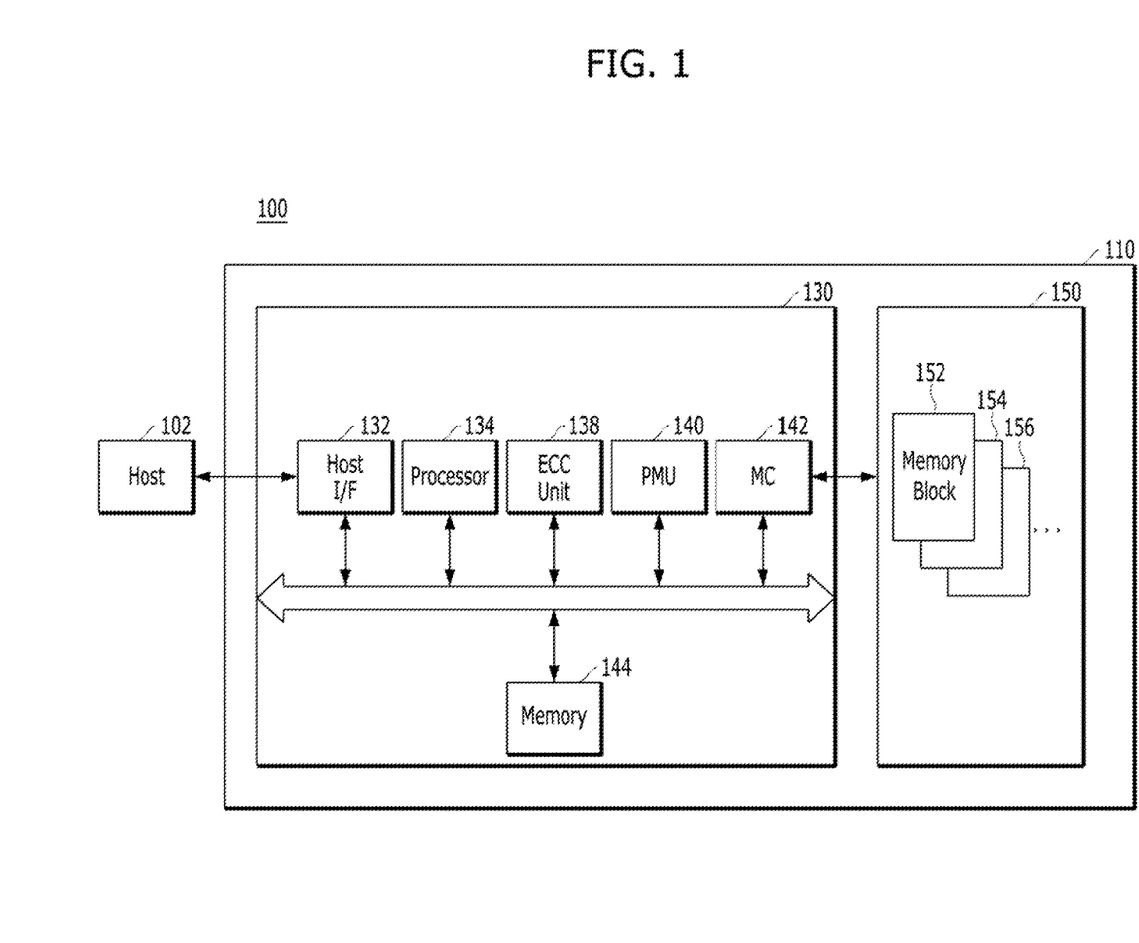
FIG. 1 illustrates a data processing system including a memory system.

FIG. 1 illustrates a data processing system 100. The data processing system 100 shown in FIG. 1 is for illustration only. Other constructions of the data processing system 100 could be used without departing from the scope of this disclosure. Although FIG. 1 illustrates one example of the data processing system 100, various changes may be made to FIG. 1. For example, the data processing system 100 may include any of elements, or may not include any of elements in any suitable arrangement.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a TV a projector, etc.

The memory system 110 may operate in response to a request from the host 102, and in particular, store data to be accessed by the host 102. In other words, the memory system 110 may be used as a main memory system or an auxiliary memory system of the host 102. The memory system 110 may be implemented with any one of various kinds of storage devices, according to the protocol of a host Interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory device 150 may be integrated into one semiconductor device and configure a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a non-volatile memory device, for example, a flash memory. The flash memory may have a three-dimensional (3D) stack structure.

The controller 130 of the memory system 110 may control the memory device 150 in response to a request from the host 102. The controller 130 may provide the data read from the memory device 150 to the host 102, and store the data provided from the host 102 into the memory device 150. To this end, the controller 130 may control overall operations of the memory device 150, such as read, write, program and erase operations.

In detail, the controller 130 may include a host interface unit 132, a processor 134, an error correction code (ECC) unit 138, a power management unit (PMU) 140, a memory controller (MC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The MC 142 may serve as a memory interface between the controller 130 and the memory device 150 to allow the controller 130 to control the memory device 150 in response to a request from the host 102. The MC 142 may generate control signals for the memory device 150 and process data under the control of the processor 134. When the memory device 150 is a flash memory such as a NAND flash memory, the MC 142 may generate control signals for the NAND flash memory 150 and process data under the control of the processor 134.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

As mentioned above, the memory device 150 may be a non-volatile memory such as a NAND flash memory. The flash memory is divided into many blocks and each block is divided into many pages. A page contains multiple addresses such as logic block addresses (LBAs), which are the smallest memory unit that can be accessed by the host device.

Unlike magnetic storage drives, flash memories do not support in-place updates. That is, when data associated with an address is to be over-written with new data, its present location in the page is simply marked as "invalid" and the new data is written to a new location in another page. Over time, many addresses in a block will gradually become invalid. To reclaim the invalid locations in the block, the data associated with the remaining valid addresses is read and written into another block, thus opening the entire block for erasure and subsequent writing with new data. This reclaiming process is termed "garbage collection (GC)."

When a solid-state drive (SSD) runs out of empty blocks to write new data, a new write request will result in garbage collection being done to create empty blocks. Therefore, writing new data into the drive could cause several write operations to occur, such as the host writes itself and the SSD writes during garbage collection.

Write amplification (WA) is defined as the ratio of the total number of writes to the memory device to the number of host writes. For example, if the host writes one LBA to the SSD and in the process causes garbage collection to conduct one extra write, the write amplification would be two. Reducing the write amplification is an important goal of memory management.

During the write operation for the memory device, data that are frequently written or updated are considered hot. Data that are infrequently or never updated after being initially written are considered cold. Data temperature (hot/cold) also exhibit temporal locality. That is, data written around the same time usually have similar temperatures. To reduce the write amplification, hot data and cold data are often separated into different blocks such that they are prevented from being mixed into the same block. If hot and cold data are mixed together in the same block, after the hot data have been invalidated, the cold data will need to be read out and re-written into another block during garbage collection. On the other hand, if hot data are clustered together, the blocks with hot data have a better chance to invalidate themselves completely and be erased (e.g., invalidation independent of a garbage collection process). If a block only includes cold data clustered therein, data of this block will not be invalidated and this block will not be garbage collected unless wear-leveling of the block is needed.

During the garbage collection, in order to reduce the write amplification (WA), a greedy process may be often used where the block with the least number of valid pages is selected as the victim block. This greedy process does not take into consideration the temperature of the data being collected. Often, the block with the least number of valid pages contains hot data, and should not be collected because these valid pages will shortly be invalidated. Instead, the block with cold data, which may have a larger number of valid pages, should be collected. Thus, embodiments of the present invention prevent the collection of hot data, and thus reduce the write amplification (WA). Embodiments of the present invention delay the garbage collection of blocks with hot data to allow more time for the hot data to be invalidated by taking into consideration the number of valid pages in the block as well as the temperature of these pages when determining the victim block for the garbage collection process.

Figure 2:
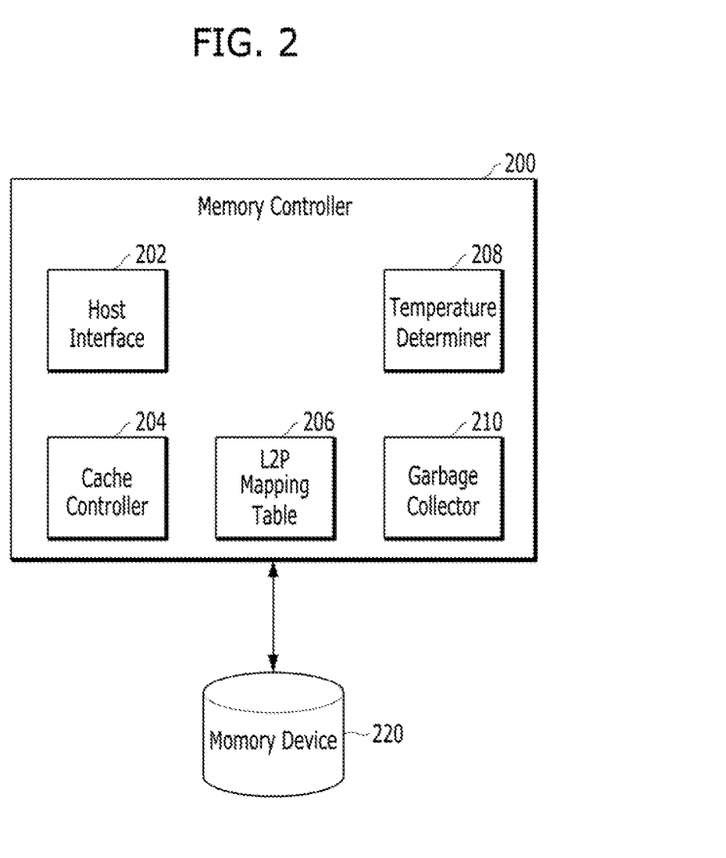
FIG. 2 illustrates a block diagram of a memory system in accordance with embodiments of the present invention.

FIG. 2 is a block diagram of a memory system in accordance with embodiments of the present invention. The embodiment of the memory system shown in FIG. 2 is for illustration only. Other embodiments of the memory system could be used without departing from the scope of this disclosure.

Referring to FIG. 2, a memory system includes a memory controller 200 and a memory device 220. For example, the memory controller 200 and the memory device 220 correspond to the memory controller 142 and the memory device 150 shown in FIG. 1, respectively. In some embodiments, the memory controller 200 may be a semiconductor device, such as an application-specific integrated circuit (ASIC) or a field-programmable gate array (FPGA).

Figure 5A:
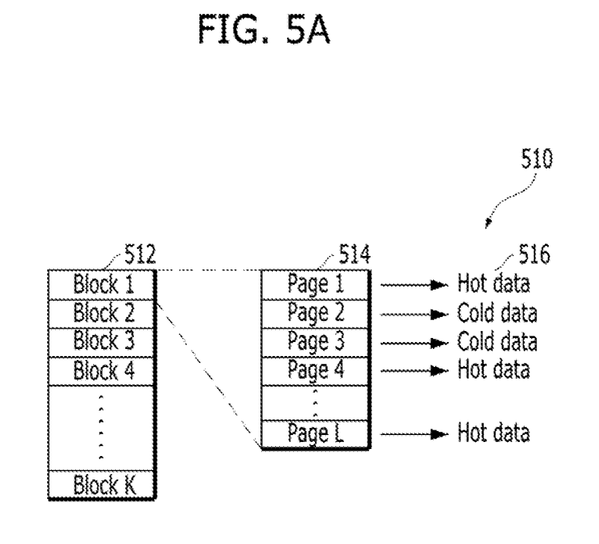
FIG. 5A and FIG. 5B illustrate examples of data processed by a garbage collection operation in accordance with embodiments of the present invention.

The memory device 220 may be a solid state storage which is divided into a cache and a regular drive (not shown). The cache may be implemented using single-level cells (SLC) which store one bit per cell. The regular drive may be implemented using multi-level cells (MLC) which store two or more bits per cell. In some embodiments, the memory device 220 may be implemented a NAND flash memory. As shown in FIG. 5A, the memory device 220 may include a plurality of blocks 512 (e.g., K blocks) and each of the blocks may a plurality of pages 514 (e.g., L pages).

The memory controller 200 includes a host interface 202, a cache controller 204, a logical to physical (L2P) mapping table 206, a temperature determiner 208, and a garbage collector 210.

The host interface 202 receives read instructions and write Instructions from a host (e.g., the host 102 in FIG. 1). The cache controller 204 periodically determines the size of cache of the memory device 220. The L2P mapping table 206 is used to record the portion of the memory device 220 that belongs to the cache versus the regular drive. For example, the L2P mapping table 206 may include the range of addresses (e.g., physical) which are in the cache versus the regular drive.

The temperature determiner 208 determines a temperature for write data received from a host. Data is hot if it will be (or is at least believed to be) invalidated or otherwise overwritten shortly in the future. Data is cold if it will remain valid (i.e., will not be overwritten) for a time longer than hot data. The temperature determiner 208 may use any appropriated technique to determine the temperature of write data received from a host. Based on the temperature determined by the temperature determiner 208, hot data and cold data are stored in the different location of the memory device 220. For example, hot data may be stored in the cache of the memory device 220, and cold data is stored in the regular drive of the memory device 220. For another example, hot data may be stored in a first block of the memory device 220, and cold data is stored in a second block of the memory device 220.

Figure 3A:
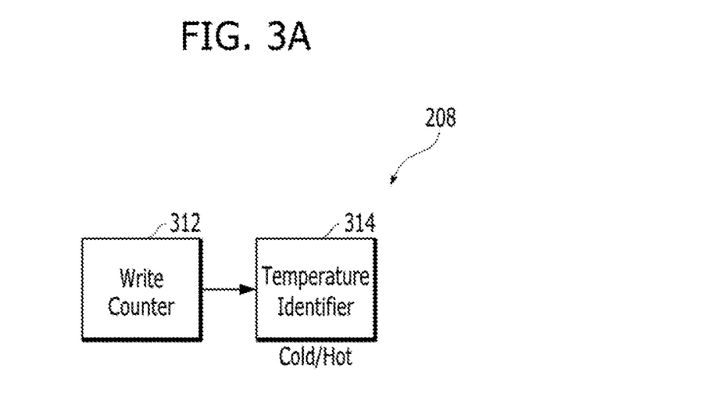
FIG. 3A illustrates a block diagram of a temperature determiner in accordance with an embodiment of the present invention.
Figure 3B:
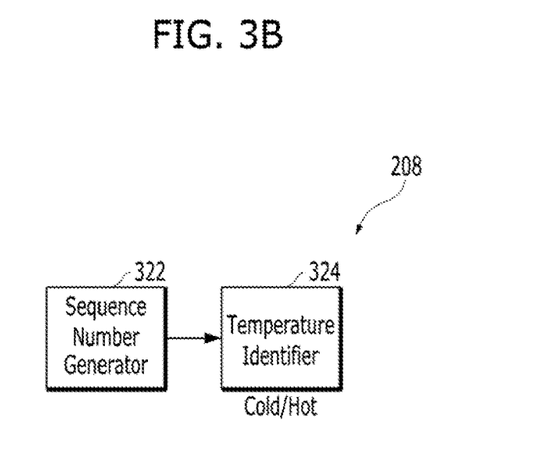
FIG. 3B illustrates a block diagram of a temperature determiner in accordance with another embodiment of the present invention.

Several methods may be used to determine the temperature of the valid pages. For example, a counter, as shown in FIG. 3A, may be used such that the temperatures of the LBA pages are determined by their write count relative to a threshold. Another example utilizes a sequence number of blocks, as shown in FIG. 3B, where blocks with smaller sequence numbers are considered to contain fewer hot pages and blocks with higher sequence numbers are considered to contain more hot pages.

The garbage collector 210 performs a garbage collection process. In order to reduce the WA, the garbage collector 210 may perform the garbage collection process in accordance with several schemes that use both the number of valid pages and their temperature to identify victim blocks.

FIG. 3A is a block diagram of a temperature determiner 208 in accordance with an embodiment of the present invention.

Referring to FIG. 3A, the temperature determiner 208 includes a write counter 312 and a temperature identifier 314. The write counter 312 counts the amount of write data to be written to the memory device 220, which are received from the host. The temperature identifier 314 identifies the temperature of the data for the valid pages by using a count value of the write counter 312. Thus, the temperature of the data for the valid pages is determined as cold data or hot data.

FIG. 3B is a block diagram of a temperature determiner 208 in accordance with another embodiment of the present invention.

Referring to FIG. 3B, the temperature determiner 208 includes a sequence number generator 322 and a temperature identifier 324. The sequence number generator 322 generates a sequence number for the blocks based on a number of hot pages contained in each of the blocks. The temperature identifier 324 identifies the temperature of the data for the valid pages by using the sequence number for the blocks. Thus, the temperature of the data for the valid pages is determined as cold data or hot data.

Figure 4:
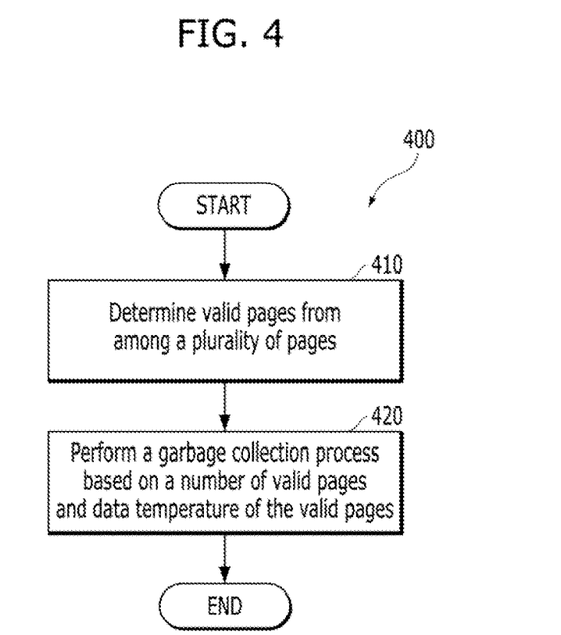
FIG. 4 is a flow chart illustrating a garbage collection operation in accordance with embodiments of the present invention.

FIG. 4 is a flowchart 400 of a garbage collection operation in accordance with embodiments of the present invention. For example, the flowchart 400 of the garbage collection operation is performed by the memory controller 200 of FIG. 2. The embodiment of the flowchart 400 shown in FIG. 4 is for illustration only. Other embodiments of the flowchart could be used without departing from the scope of this disclosure.

Referring to FIG. 4, at step 410, for each of a plurality of blocks in the memory device 220, the memory controller 200 determines valid pages from among a plurality of pages of the blocks. At step 420, the memory controller 200 performs a garbage collection process based on a number of valid pages and data temperature of the valid pages.

Figure 5B:
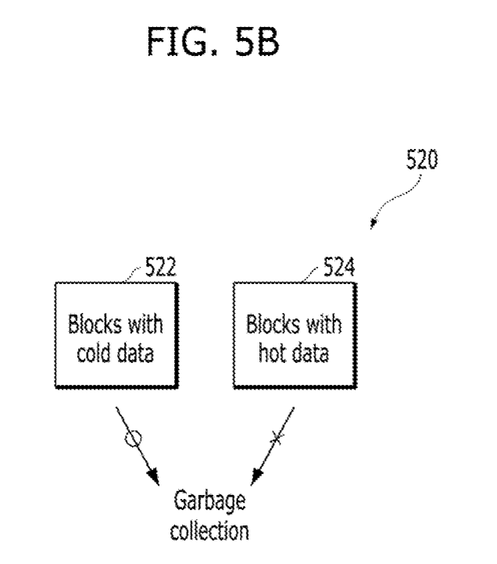

FIG. 5A and FIG. 5B are examples 510, 520 of data processed by a garbage collection operation in accordance with embodiments of the present invention. For example, the memory controller 200 of FIG. 2 performs the garbage collection operation for data to be written in the memory device 220 of FIG. 2.

Referring to FIG. 5A, the memory device 220 includes a plurality of memory blocks 512 (e.g., Block 1 to Block K). Each of the memory blocks includes a plurality of pages 514. For example, memory block Block 1 includes L pages (e.g., Page 1 to Page L). The memory controller 200 determines the temperatures 516 of the pages for each block according to one of various embodiments (FIGS. 3A, 3B). For example, the memory controller 200 determines Page 1, Page 4 and Page L as a hot data, and determines Page 2 and Page 3 as a cold data.

Referring to FIG. 58B, to reduce the WA, the memory controller 200 prevents the collection of hot data. While blocks with cold data 522 are collected, blocks with hot data 524 are not collected. Like this, the memory controller 200 separates data as either hot data or cold data, and delays the garbage collection for blocks with hot data, thus allowing more time for the hot data to be invalidated.

FIG. 6A to FIG. 8B are flow charts Illustrating a garbage collection operation in accordance with various embodiments of the present invention. For example, the memory controller 200 of FIG. 2 performs the garbage collection operation for data to be wrote in the memory device 220 of FIG. 2. Various embodiments take into consideration the number of valid pages in the block as well as the temperature of these pages when determining the victim block for the garbage collection process.

Figure 6A:
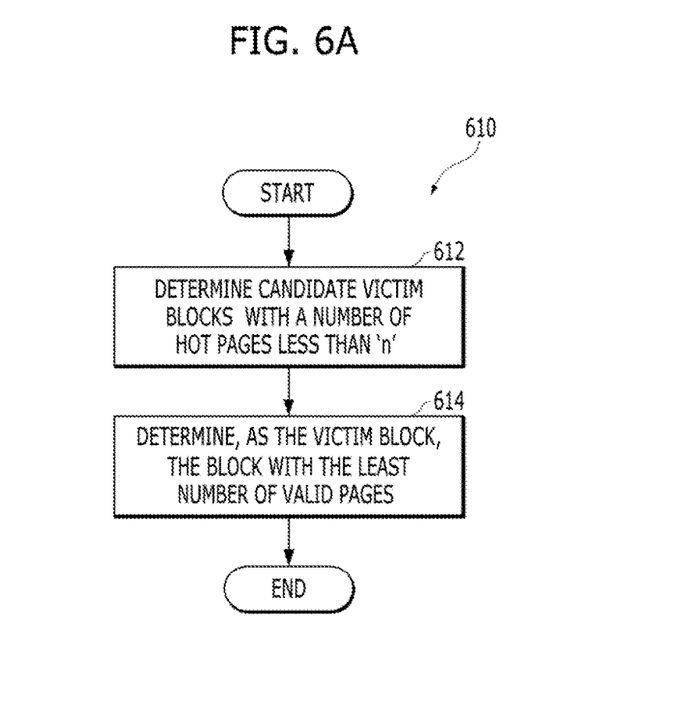
FIG. 6A is a flow chart illustrating a garbage collection operation in accordance with an embodiment of the present invention.
Figure 6B:
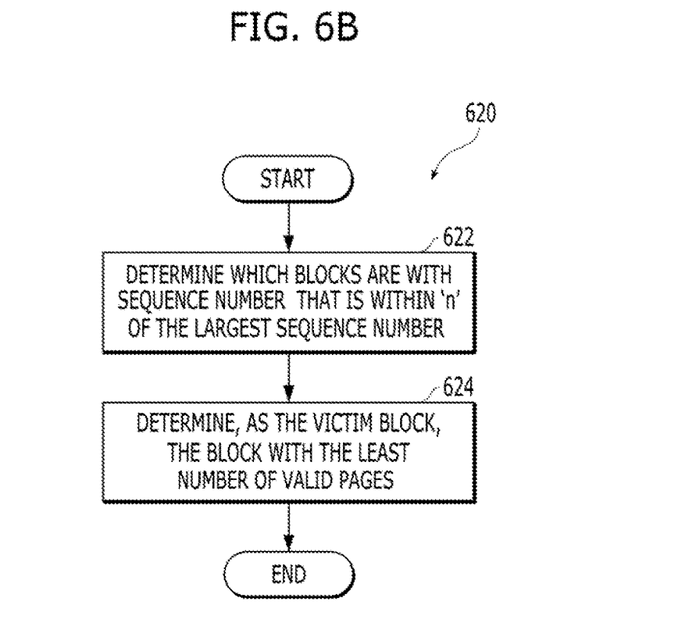
FIG. 6B is a flow chart illustrating a garbage collection operation in accordance with an embodiment of the present invention.

In FIGS. 6A and 6B, the garbage collection operation is performed such that blocks with too much hot data are prevented from being garbage collected. FIG. 6A is a flow chart illustrating a garbage collection operation 610 using a write counter. For example, the memory controller 200 of FIG. 2 performs the garbage collection operation for data to be wrote in the memory device 220 of FIG. 2.

Referring to FIG. 6A, at step 612, candidate victim blocks are determined, such that blocks with a number of hot pages less than the number 'n' are determined to be candidate victim blocks. Thus, the blocks with number of hot pages greater than n cannot be a candidate victim block during the garbage collection.

At step 614, the victim block is determined as the block with the least number of valid pages. In the pool of blocks that are candidates for the garbage collection, the block with the smallest number of valid pages is chosen as the victim block. The number n may be predetermined. For example, n could be half of the total number of pages that can be stored in a block.

FIG. 6B is a flow chart illustrating a garbage collection operation 620 using a sequence number process. For example, the memory controller 200 of FIG. 2 performs the garbage collection operation for data to be wrote in the memory device 220 of FIG. 2.

Referring to FIG. 6B, at step 622, the blocks with a sequence number that is within n of the largest sequence number is determined. The blocks with a sequence number that is within n of the largest sequence number cannot be a candidate victim block during the garbage collection. Thus, the blocks with a sequence number that is outside of n of the largest sequence number are determined to be candidate victim blocks.

At step 624, the victim block is determined as the block with the smallest number of valid pages within the candidate victim blocks. In the pool of blocks that are candidates for the garbage collection, the block with the smallest number of valid pages is chosen as the victim block. The number n may be predetermined. For example, n could be a quarter of the total number of blocks in the memory device 220.

Figure 7A:
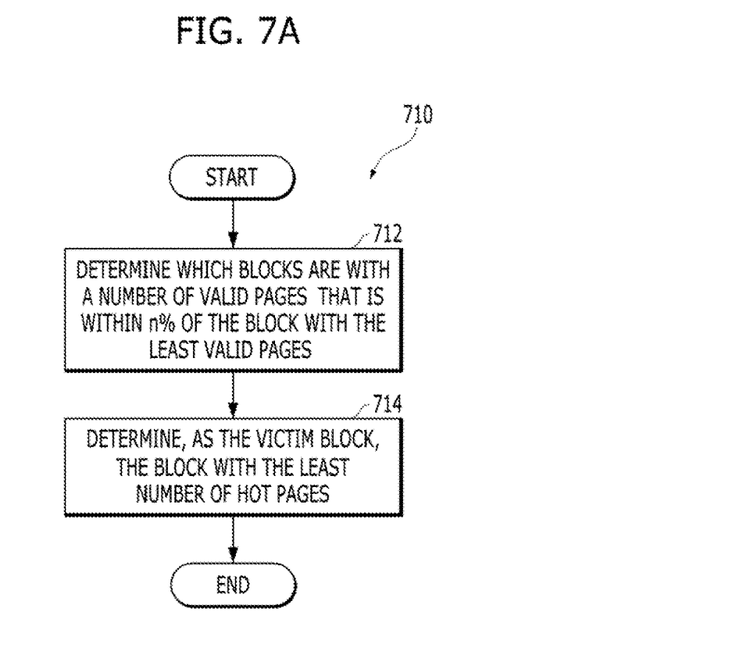
FIG. 7A is a flow chart illustrating a garbage collection operation in accordance with an embodiment of the present invention.
Figure 7B:
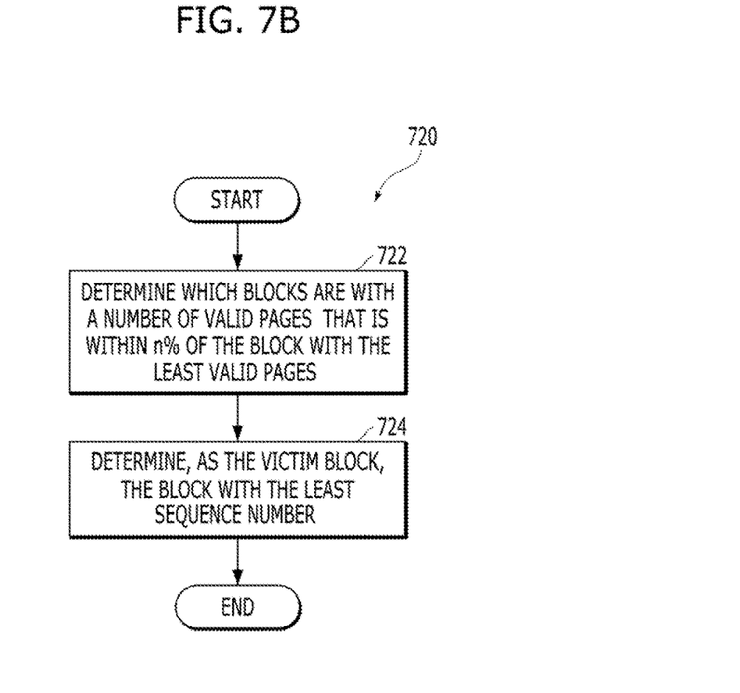
FIG. 7B is a flow chart illustrating a garbage collection operation in accordance with an embodiment of the present invention.

In FIGS. 7A and 7B, the garbage collection operation is conducted such that blocks are first double sorted according to a number of valid pages and temperature before a victim block is chosen. FIG. 7A is a flow chart 710 illustrating a garbage collection operation using a write counter. For example, the memory controller 200 of FIG. 2 performs the garbage collection operation for data to be wrote in the memory device 220 of FIG. 2.

Referring to FIG. 7A, at step 712, the blocks with a number of valid pages that is within n % of the block with the least valid pages are determined. The determined blocks at step 712 make up the candidate victim blocks.

At step 714, the block from among the candidate victim blocks determined at step 712 with the least number of hot pages is determined as the victim block. The percentage may be predetermined. For example, it may be set to 105%, and all blocks with 5% more valid pages than the block with the minimum number of valid pages are eligible to become the victim block.

FIG. 7B is a flow chart 720 illustrating a garbage collection operation using a sequence number. For example, the memory controller 200 of FIG. 2 performs the garbage collection operation for data to be wrote in the memory device 220 of FIG. 2.

Referring to FIG. 7B, at step 722, the blocks with a number of valid pages that is within n % of the block with the least valid pages are determined. Within these blocks, at step 724, the block with the smallest sequence number is determined as the victim block. The percentage may be predetermined. For example, it may be set to 105%, and all blocks with 5% more valid pages than the block with the minimum number of valid pages are eligible to become the victim block.

Figure 8A:
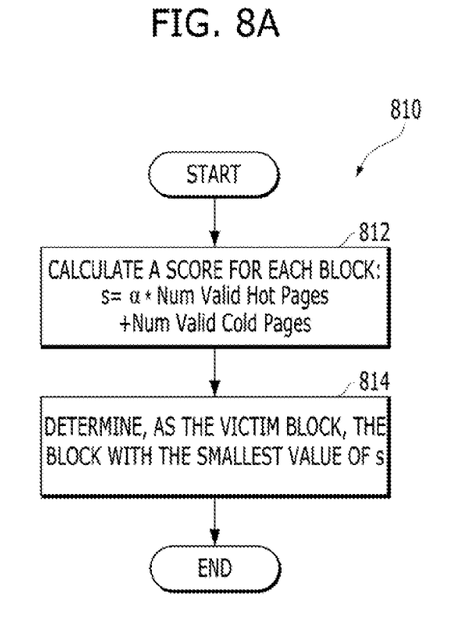
FIG. 8A is a flow chart illustrating a garbage collection operation in accordance with an embodiment of the present invention.
Figure 8B:
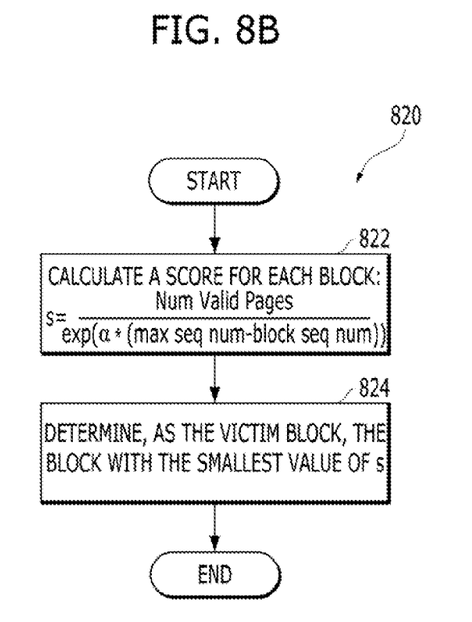
FIG. 8B is a flow chart illustrating a garbage collection operation in accordance with an embodiment of the present invention.

In FIGS. 8A and 8B, a score is calculated for each block. The score penalizes the number of hot valid pages in the block and does not penalize the number of cold pages in the block. For example, assume collecting a cold LBA, on average, causes or creates a write amplification (WA) overhead of x. Collecting a hot LBA would create more WA overhead because it will be shortly invalided and causing more garbage collection operations. In the examples below, the write amplification of collecting a hot page is represented by ax and the hot pages in the block will be penalized by a.

FIG. 8A is a flow chart 810 illustrating a garbage collection operation using a write counter. For example, the memory controller 200 of FIG. 2 performs the garbage collection operation for data to be wrote in the memory device 220 of FIG. 2.

Referring to FIG. 8A, at step 812, the score s for each block is calculated. For example, the score s for each block is calculated as:

$$s = \alpha * \text{Num Valid Hot Pages} + \text{Num Valid Cold Pages} \quad (1)$$

where $\alpha$ is a predetermined value greater than 1, Num Valid Hot Pages represents the number of valid pages with hot data, and Num Valid Cold Pages represents the number of valid pages with cold data. Then, at: step 814, the block with the smallest value of s is determined as the victim block.

FIG. 8B is a flow chart 820 illustrating a garbage collection operation using a sequence number. For example, the memory controller 200 of FIG. 2 performs the garbage collection operation for data, to be wrote in the memory device 220 of FIG. 2.

Referring to FIG. 8B at step 812, the score s for each block is calculated. For example, the score s for each block is calculated a $$s = \frac{\text{Num Valid Pages}}{\exp(\alpha * (\max seq\ num - block\ seq\ num))} \quad (2)$$

where $\alpha$ is a predetermined value greater than 0, Num Valid Pages represents the number of valid pages, max seq num represents the maximum sequence number and block seq num represents the block sequence number. Then, at step 824, the block with the smallest value of s is determined as the victim block.

In some applications, using a sequence number may be easier to implement than using a write counter to determine LBA temperature. However, it is also gives much less reduction in the write amplification. If desired, the above described methods may be combined in various ways. For example, flowchart 720 and flowchart 820 may be combined by first determining the blocks that have a number of valid pages within n % of the minimum valid page, and then using a weighted score to determine the victim block.

Figure 9:
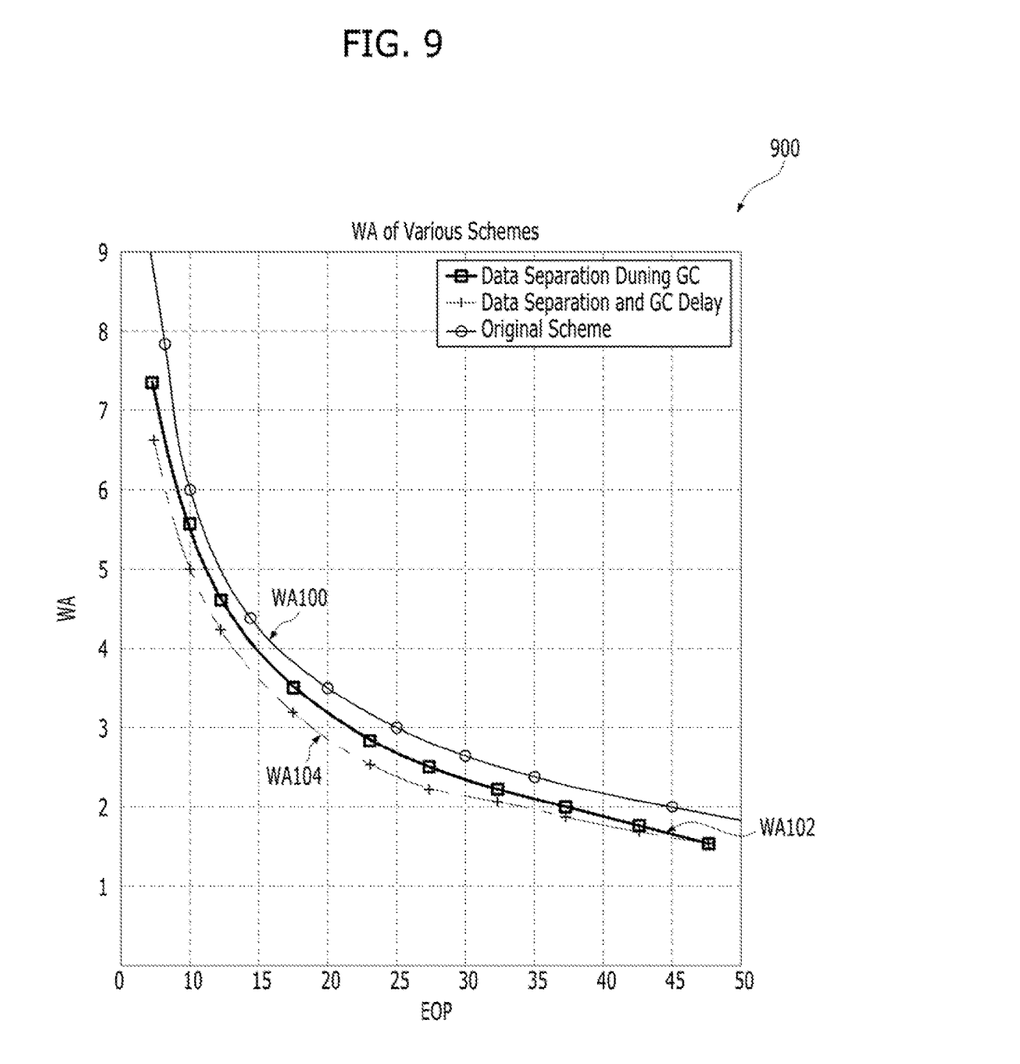
FIG. 9 is a graph illustrating a performance of a garbage collection operation in accordance with embodiments of the present invention.

FIG. 9 is a graph 900 illustrating a performance of a garbage collection operation in accordance with embodiments of the present invention.

In one example implementation, the flowchart 720 is implemented. The value of n is set to 120%. A comparison of the schemes for JEDEC 219 enterprise traffic is shown in FIG. 9. The curve (WA100) is the case where no data separation is conducted, this serves as a baseline for comparison. The curve (WA102) is the WA when data separation is done during the garbage collection. As shown in graph 900, some reduction in WA can be achieved by separating hot data from cold data. The curve (WA104) is the WA when the garbage collection delay is conducted as well as data separation. As shown in graph 900, additional reduction in WA can be achieved. Note that a single value of n is used for all EOP cases. If desired, the value of n is optimized for each EOP.

While the present invention has been particularly shown and described with reference to exemplary embodiments thereof, it will be understood by those of ordinary skill in the art that various changes in form and details may be made therein without departing from the spirit and scope of the present invention as defined by the following claims. Thus, the foregoing is by way of example only and is not intended to be limiting. For example, any numbers of elements illustrated and described herein are by way of example only. The present invention is limited only as defined in the following claims and equivalents thereof.

What is claimed is:

1. A memory system comprising:
a memory device including a plurality of blocks, each of the blocks including a plurality of pages; and
a controller coupled with the memory device and configured to
receive data and write the data to the memory device;
determine which one of the plurality of blocks has the least number of valid pages, and determine which of the plurality of blocks have a number of valid pages within a set percentage of the block with the least number of valid pages as candidate victim blocks, and
determine a victim block on which to perform a garbage collection process based on at least a score of each of the candidate victim blocks by calculating the score of each of the candidate victim blocks, wherein the score of a select block, among the candidate victim blocks, is calculated as a number of valid pages in the select block divided by an exponential of a function, wherein the function is a product of a value and a difference between a maximum sequence number of the plurality of blocks and a sequence number of the select block;
wherein the controller comprises:
a temperature determiner configured to determine a data temperature of each of the valid pages, and
a garbage collector configured to perform the garbage collection process based also on the data temperature.

2. The memory system of claim 1, wherein the garbage collector is configured to:
perform the garbage collection process for the victim block.

3. The memory system of claim 1, wherein the temperature determiner comprises:
a write counter configured to count the data to be written; and
a temperature identifier configured to identify the data temperature for the valid pages based on a count value generated by the write counter, wherein the data temperature for the valid pages is determined as cold data or hot data, and the valid pages are determined as hot pages or cold pages.

4. The memory system of claim 3, wherein the garbage collector is configured to:
determine the candidate victim blocks by excluding blocks with a number of hot pages greater than a predetermined number.

5. The memory system of claim 3, wherein the garbage collector is configured to:
determine a block with a smallest score from among the candidate victim blocks as the victim block.

6. The memory system of claim 1, wherein the temperature determiner comprises:
a sequence number generator configured to generate the sequence numbers for the blocks, a temperature identifier configured to identify the data temperature of the data for the valid pages based on the sequence numbers from the sequence number generator for the blocks, wherein the data temperature of the data for the valid pages is determined as cold data or hot data, and the valid pages are determined as hot pages or cold pages, and
the garbage collector configured to:
determine the candidate victim blocks by excluding blocks with sequence numbers within a predetermined number of the maximum sequence number.

7. A method for controlling a memory system having a memory device including a plurality of blocks, each of the blocks including a plurality of pages, comprising:
receiving data and writing the data to the memory device;
determining which one of the plurality of blocks has the least number of valid pages, and determine which of the plurality of blocks have a number of valid pages within a set percentage of the block with the least number of valid pages as candidate victim blocks;
determining a victim block on which to perform a garbage collection process based on at least a score of each of the candidate victim blocks by calculating the score of each of the candidate victim blocks, wherein the score of a select block, among the candidate victim blocks, is calculated as a number of valid pages in the select block divided by an exponential of a function, wherein the function is a product of a value and a difference between a maximum sequence number of the plurality of blocks and a sequence number of the select block; and
performing the garbage collection process including determining a data temperature of data corresponding to each of the valid pages.

8. The method of claim 7, wherein the performing of the garbage collection process comprises:
performing the garbage collection process for the victim block.

9. The method of claim 7, further comprising:
counting the data to be written, and
wherein the determining of the data temperature of the data comprises identifying the data temperature of the data for the valid pages based on a count value relative to a threshold value, the data temperature of the data for the valid pages is determined as cold data or hot data, and the valid pages are determined as hot pages or cold pages.

10. The method of claim 9, wherein the performing of the garbage collection process comprises:
determining the candidate victim blocks by excluding blocks with a number of hot pages greater than a predetermined number.

11. The method of claim 9, wherein the performing of the garbage collection process comprises:
determining a block with a smallest value of score from among the candidate victim blocks as the victim block.

12. The method of claim 7, wherein the performing of the garbage collection process comprises:
generating sequence numbers for the blocks,
wherein the determining of the data temperature of the data comprises identifying the data temperature of the data for the valid pages based on the sequence numbers for the blocks, the data temperature of the data for the valid pages is determined as cold data or hot data, and the valid pages are determined as hot pages or cold pages; and determining the candidate victim blocks by excluding blocks with sequence numbers within a predetermined number of the maximum sequence number.

\* \* \* \* \*